May 4, 1937. W. G. THURBER 2,079,536
STEERING MECHANISM FOR MOTOR VEHICLES
Filed June 18, 1936 3 Sheets-Sheet 3
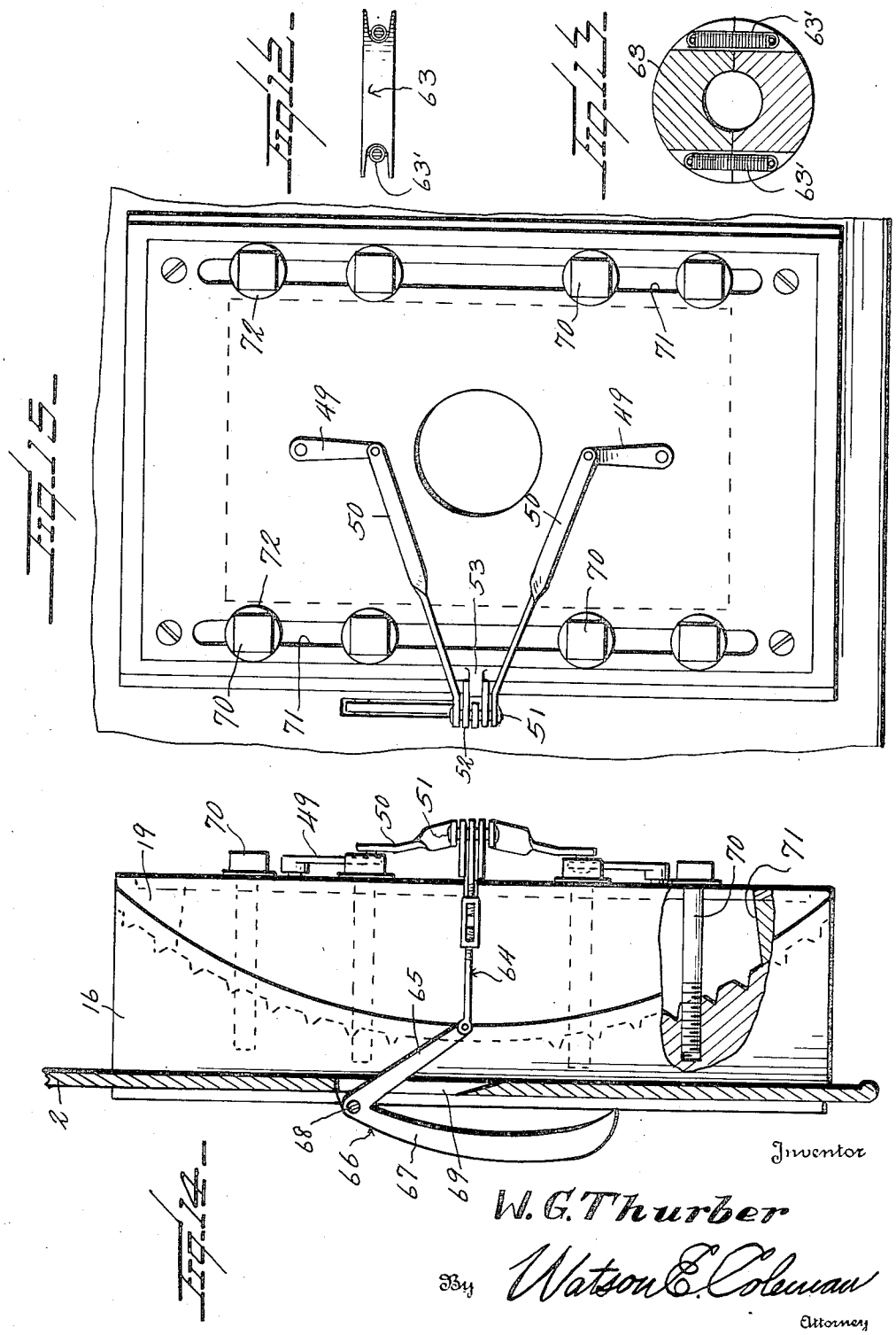
Inventor
W. G. Thurber
By Watson E. Coleman
Attorney Patented May 4, 1937

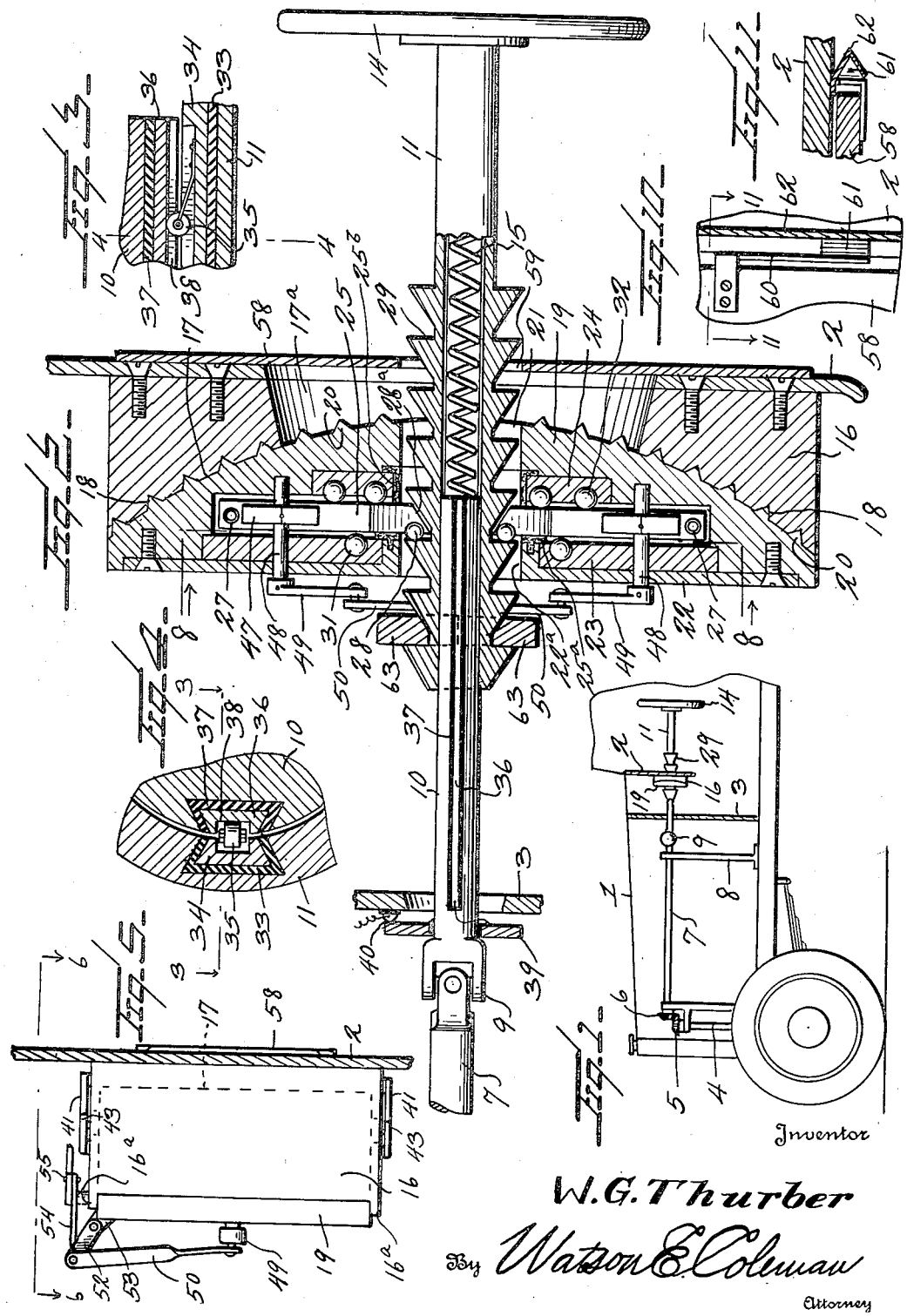

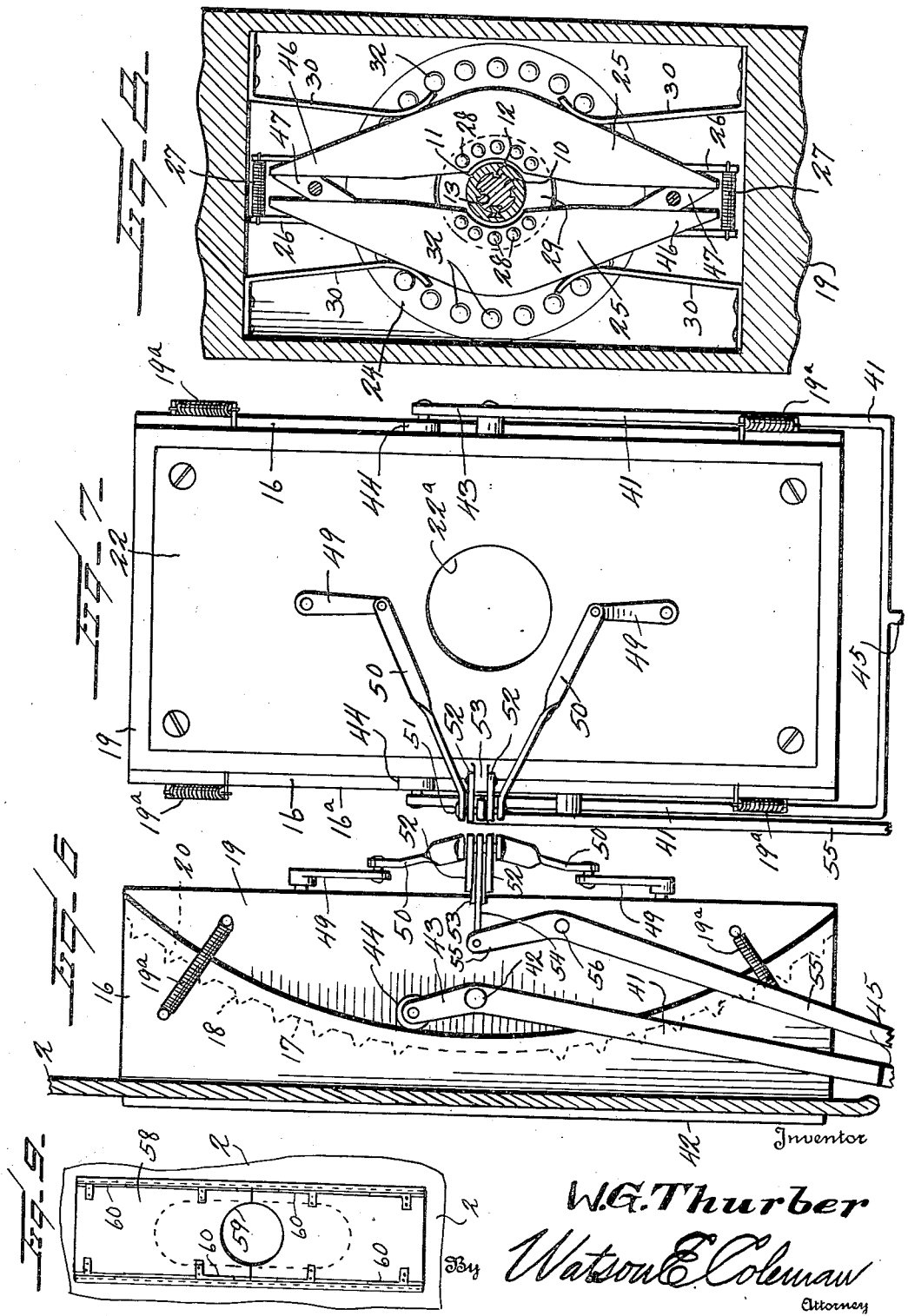

2,079,536

UNITED STATES PATENT OFFICE 2,079,536

STEERING MECHANISM FOR MOTOR VEHICLES

William G. Thurber, Santa Monica, Calif.

Application June 18, 1936, Serial No. 85,972

18 Claims. (Cl. 74—493)

This invention relates to the class of vehicles and pertains particularly to an improved form of steering wheel construction for the same.

The primary object of the present invention is to provide an improved steering mechanism designed particularly for motor vehicles, in which the steering post is adapted to be shifted longitudinally against a restraining mechanism in the event of an accident whereby the driver behind the steering wheel carried upon the post will be saved from the serious injury which so frequently results in motor vehicle accidents.

Another object of the invention is to provide an improved steering post construction which may be readily adjusted as to length to suit the needs of the individual driver.

A further object of the invention is to provide an improved steering post which is adapted to be vertically adjusted as well as longitudinally, so as to accommodate drivers of different heights.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view illustrating diagrammatically the forward portion of a motor vehicle showing the steering wheel structure embodying the present invention applied thereto.

Fig. 2 is a view in vertical longitudinal section through the improved steering wheel structure.

Fig. 3 is a sectional view through a portion of the two parts of the steering post showing means for conducting electric current from one to the other of the portions.

Fig. 4 is a section taken transversely of the structure illustrated in Fig. 3 and upon the line 4—4 of Fig. 3.

Fig. 5 is a view in top plan of the steering shaft supporting body, the adjacent instrument board being in section.

Fig. 6 is a view in side elevation of the steering wheel supporting body, being a section upon an enlarged scale taken approximately on the line 6—6 of Fig. 5.

Fig. 7 is a view in elevation of the rear side of the steering wheel supporting body.

Fig. 8 is a sectional view taken on the line 8—8 of Fig. 2.

Fig. 9 is a view in elevation of the face of the instrument panel showing a cover plate for the steering shaft receiving opening in the supporting body.

Fig. 10 is a view illustrating in detail the frictional engaging means for supporting the slide plates in adjusted position.

Fig. 11 is a section on the line 11—11 of Fig. 10.

Fig. 12 is a view in edge elevation of the steering column carried safety collar.

Fig. 13 is a view in section of the collar.

Fig. 14 is a view in side elevation of column controlling mechanism as designed for use upon a truck or heavy duty vehicle.

Fig. 15 is a view in elevation of the structure shown in Fig. 14.

Referring now more particularly to the drawings wherein like numerals of reference designate corresponding parts throughout the several views, Figure 1 illustrates the application of the present improved safety steering mechanism embodying the present invention to a motor vehicle, the forward portion or hood of which is indicated generally by the numeral 1, while the dash is indicated at 2 and the dividing wall or fireboard, which is disposed forwardly of the dash 2 and between the interior of the car and the area under the hood where the engine is located, is indicated by the numeral 3.

In carrying out the present invention, there is employed a vertically disposed shaft 4 which is coupled in a suitable manner with the regular or standard steering elements of the car which are disposed between the front wheels, the upper end of which shaft is provided with a beveled gear 5 which meshes with a similar gear 6 carried upon a horizontal shaft 7 which extends rearwardly for attachment to the portion of the steering post in which the present invention is embodied. This rear portion of the shaft 7 is mounted upon a suitable supporting unit or bearing 8 and at its rear end it is joined to one of the two elements of a universal joint which is indicated generally by the numeral 9.

The steering column which is constructed in accordance with the present invention, comprises a solid shaft 10 to one end of which the other element of the universal joint 9 is attached, and a tubular shaft 11 into which the other end of the shaft 10 extends. The inner surface of the tubular shaft is provided with splines 12 which engage in suitably formed receiving grooves 13 in the shaft 10, thus permitting the telescopically associated shafts to move relatively longitudinally but preventing relative rotary movement therebetween. The end of the tubular shaft 11 remote from the shaft 10, is closed and has the hand wheel 14 fixed thereto and in the area between the closed end of the tubular shaft 11 and the inserted end of the shaft 10, there is mounted a relatively heavy spring 15 which normally tends to expand to shift the tubular portion 11 of the steering column toward the driver of the vehicle. These telescoping units 10 and 11 of the steering column pass through a suitable opening in the dash 2 of the vehicle and secured to the back face of the dash is a solid block body 16 which has an arcuate recess 17 in its anterior face and through the center of which the telescoping shaft or column extends. The arc of the recess 17 of the block 16 is struck from the center of the universal coupling 9 and the block body 16 is provided with a vertical elongated or elliptical opening 17a in which the steering column may be moved. The dash or instrument board 2 is also provided with a similar vertical opening conforming to the width and length of the opening 17a in the block body.

The inner surface of the arcuate area 17 has a series of transverse grooves or notches 18 cut therein and lying in the recess 17 is a shell 19 having an arcuate exterior surface conforming in contour to the recess 17 and provided with transverse ribs 20 which are adapted for detachable engagement in the grooves or notches 18. The face of the recess 17 is arcuate only in a vertical plane but is flat or straight transversely and the exterior convex surface of the shell 19 is also transversely straight so that the shell, which is provided with a central opening 21 through which the tubular portion 11 of the steering column passes, may be moved over the surface 17 when the steering column is raised or lowered. The back of the body 19 is closed by the removable cover 22 and housed within the body, and maintained in place therein by the removable cover, are the two disks 23 and 24, each of which has a central opening through which the portion 11 of the steering column passes. Interposed between these disks 23 and 24 is a diametrically divided disk 25, each of the two portions of which has at the end of its straight edge, an ear 26 which is in opposed relation with the ear of the other disk portion, and these ears are connected by springs 27. This divided disk has anti-friction balls 28 bordering the edge of the central opening therethrough, through which the tubular portion of the steering column passes and these bearing balls engage in one of the grooves between a series of check ribs 29 which are formed about the exterior of the tubular shaft 11. In addition to the springs 27, there are disposed within the shell body 19, the four tension springs 30 which are in the form of leaves or fingers which engage the outer edges of the portions of the divided disk 25, and normally urge the same inwardly into close gripping relation with the grooved surface of the shaft 11.

As illustrated in Figure 2, the balls 28 bear against the vertical faces of the ribs 29 and the edges of the two parts of the divided disk 25 are beveled, as indicated at 28a to conform approximately with the bevel or degree of inclination of the underlying side of the adjacent rib.

In order that the movement of the parts of the divided disk 25 may be smooth between the disks 23 and 24, one of these latter disks, such as the disk 23, is provided with an annular series of anti-friction balls 31 in the face opposing the disk 25, while the other is provided with two annular series of anti-friction balls, each of which is indicated by the numeral 32, in the face opposing the other side of the disk 25, and as will be seen from the illustration, the diameter of the annulus defined by the balls 31 lies between the diameters of the annuli defined by the two series of balls 32. With this construction, it will be apparent that the spring 15 in operating to move the tubular portion 11 of the column outwardly upon the portion 10, will maintain the body 19 firmly in position in the recess 17 through the engagement of the divided disk 25 with the annular ribs 29 and that vertical adjustment of the steering column may readily be made by forcing the same to swing upwardly or downwardly. In order that the body 19 may be held against rearward movement when the tubular portion 11 of the steering column is shifted longitudinally inwardly, the two bodies 16 and 19 are joined between their vertical sides by the springs 19a, as illustrated in Figures 6 and 7. As is also clearly illustrated in these figures and in Figure 5, the body 16 is formed to provide flanges 16a at the sides of the arcuate area 17, between which the body 19 lies. These flanges prevent the body 19 from moving laterally with respect to the body 16 but permit its vertical movement in an arcuate path.

Figures 6 and 7 illustrate means by which the movable body 19 may be shifted longitudinally of the steering column to disengage the ribs 20 from the grooves 18, against the tension of the springs 19a, to permit the steering column to be oscillated vertically as desired. This mechanism comprises a yoke having the side arms 41 which extend vertically along the sides of the bodies 16 and 19, and are pivotally attached adjacent their upper ends, as indicated at 42, to the sides of the body 19. The arms 41 extend a short distance beyond the pivotal points 42 and are bent slightly toward the adjacent edges of the flanges 16a, the extensions being indicated by the numeral 43 and each extension carries a roller 44 upon its end which contacts with the adjacent flange 16a, as shown in Figure 6. The arms 41 forming the yoke, which is clearly illustrated in Figure 7, come together at the vertical center of the unit comprising the bodies 16 and 19, and join a downwardly extending lever 45, which projects beneath the instrument panel of the car so that it may be conveniently engaged by the foot of the driver to effect the oscillation of the arms 41 and the shifting of the body 19 in the manner described.

From the description thus far given, it will be apparent that the portion of the steering column embodying the present invention may be readily moved vertically about the center of the universal coupling 9, to suit the convenience of the vehicle operator. It will also be readily apparent that the tubular portion 11 may be conveniently pushed forward upon the solid portion or shaft 10 to shorten the column and also that in the event of an accident, the driver will not be injured by being thrown against the end of the steering column or against the steering wheel 14, as the portion 11 will readily slide forward and will be held from returning by the engagement of the portions of the divided disk 25 between a pair of ribs 29.

In order that the portion 11 of the steering column may be drawn outwardly in adjusting the length of the column, it is necessary that a means be provided whereby the two portions of the divided disk 25 may be separated to the point where the ribs 29 may pass back through the central opening of this disk, and to facilitate this, the disk 25 is provided with the extended portions 46 at the ends of the opposed straight edges thereof and between each pair of these extended portions, there is disposed a camming element 47, which is mounted upon a short rocking pin 48 which passes from the back of the body 19 into the wall of the same, as illustrated in Figure 2, passing through the outer bearing ball carrying plate or disk 23.

As shown in Figure 2, the forward face or side of the body 19 is closed by the plate 22 and this has a sleeve-like portion 22ª which extends inwardly to the disk 25 where it carries a washer 25ª which bears against the disk 25 in the manner illustrated. At the opposite side of the disk 25 is a cylindrical gasket 25ᵇ which encircles the portion 11 of the steering column and bears at one end against the other face or side of the disk 25, passing through the bearing ball carrying disk 24. These parts 25ª and 25ᵇ comprise a means for retaining a suitable heavy lubricant in the area between the two faces of the divided disk 25 and the adjacent disks 23 and 24.

As illustrated in Figure 2, the rocking pins pass through the plate 22 and each has attached to its outer end a short lever 49. These levers 49 are connected by the links 50 which extend laterally in convergent relation beyond one side of the body 19 where they are connected by a pivot pin 51 which passes through the ends of a pair of short spaced parallel rocking links 52 which have their other ends rockably secured to a fixed post 53 carried by the body 19. Between the links 52, the pin 51 also has pivotally attached thereto one end of a link 54 which extends rearwardly toward the panel 2 for attachment to a lever 55. This lever is pivotally attached as at 56 to one side of the body 19, and has a short portion 57 which extends upwardly for attachment to the link 54 while the major portion extends downwardly as illustrated in Fig. 6, to a point where it may be conveniently engaged by the foot of the operator of the car. From this construction it will be apparent that when the lever 55 is oscillated it will effect a pulling action upon the links 50 and the levers 49, so as to rock the cams 47 and spread the two portions of the two-part disc sufficiently to allow the ribs 29 to pass so that the extensible portion 11 of the steering column may be drawn outwardly to the desired extent.

Upon the face of the instrument panel 2 there is mounted a two-part elongated plate 58 which has a central aperture 59 through which the steering shaft unit, particularly the portion 11, passes. The plate is divided transversely through the center of this opening 59 and each vertical edge of each half of the plate carries a series of elongated fingers 60 which are secured at one end to the plate and each of which at its other end has the laterally directed rib-like portion 61 which engages in a guide groove 62 which extends along the adjacent edge of the plate. By this means, the plate portions are resiliently retained so that when either is shifted vertically it will maintain the position to which it has been moved.

In order that the usual electrical connections may be made along the steering column for the operation of a horn through the closing of a button switch upon the steering wheel, which switch is not illustrated, the inner surface of the tubular portion 11 of the column is provided with a channel of insulation which is indicated by the numeral 33, which is housed within a metallic strip 34 which forms a current conductor and which at its upper end may be connected by wires or in any other suitable manner with the horn button switch. The face of the metallic strip 34 may be provided with rollers 35 for contact with the face of a similar strip of metal 36 which is housed in a longitudinally extending insulating channel 37 secured in and longitudinally of the shaft 10 of the steering column. This strip 36 may be provided in its outer face with a suitable groove 38 in which the contact rollers 35 of the adjacent strip may move. At its forward end, the metallic strip 36 of the shaft 10 is electrically coupled with a collar 39 surrounding and secured to the shaft 10, and this collar has wiping contact with a suitable electric terminal 40 fixed upon the stationary partition 3 from which current conducting wires, not shown, may extend to one side of the battery of the motor vehicle, the other side being connected to one side of the vehicle horn which has its other side grounded in the usual manner.

In order that the tubular portion 11 of the steering mechanism may not be projected rearwardly against the driver of the vehicle in the event of failure of the two-part disc to hold the parts against the tension of the spring 15, there is provided a collar 63 which is secured to the rear end of the tubular portion 11 and which will be brought into abutting relation with the plate 22 in the event of failure of the parts in the manner described. This collar may be secured to the tubular shaft in any suitable manner as, for example, it may comprise a disc divided as illustrated in Fig. 13, the two parts of which may be connected by springs 63' which will operate constantly to draw the two disc parts together into the position in which the disc is illustrated in Fig. 2.

The parts of the structure illustrated particularly in Figs. 6 and 7, such as the yoke mechanism 41, the lever 55, and the springs 19ª, are designed particularly for use in association with the other mechanisms when the same is used or mounted upon a pleasure car. When the device is to be used upon a heavy vehicle such as a truck, the external parts illustrated in Figs. 14 and 15 are employed. In this modified construction the operating mechanism for the cams 47 which are illustrated in Fig. 8, comprises a turnbuckle link which is designated generally by the numeral 64 and which has one end pivotally attached to the point 51 while the other end is attached to one end of the arm portion 65 of a bell-crank type of lever which is indicated generally by the numeral 66. The arms 65 and 67 of this lever are disposed at an acute angle, as illustrated in Fig. 14, and at the point of connection between these arms the lever is pivotally mounted upon a support 68 which may be of any suitable character and which is carried by the instrument panel 2 so that the arm 65 may pass thru the opening 69 in the panel of the mechanism disposed upon the opposite side thereof from the pivot 68 and the arm 67 may be disposed conveniently upon the face of the panel for the operator of the vehicle to grasp and actuate it when necessary. The arm 67 therefore constitutes a handle by means of which the parts controlling the spreading of the divided disc 25 may be actuated.

In place of the springs 19ᵃ for holding the movable body 19 in a desired position relative to the body 16, the modified form of the invention employs securing bolts 70. These bolts which are preferably four to each side of the device, pass through the longitudinally extending slots 71 which are formed through the body 19 at each side thereof as illustrated at 15, and threadably enter suitable bores in the fixed body 16. In order that the body 19 may be moved to adjust the steering wheel vertically as desired to suit the convenience of the vehicle operator, the bolts 70 must be backed out sufficiently to move the heads thereof the necessary distance to allow the body 19 to be moved back from the body 16 and then shifted to the desired position. When the bodies 16 and 19 are in the normal position shown in Fig. 14, the heads of the bolts 70 will have ordinary flat washers 72 therebeneath, but when the body 19 is shifted up or down so that the under sides of the heads of the bolts will be at an angle to the opposing surface of the body 19, the washers 72 will be replaced by other washers of suitable wedge-shaped form to provide a firm bearing surface for the bolt heads.

Since the adjustment of the body 19 will only be made at infrequent intervals when the device is used upon a truck, because of the fact that trucks are usually operated over a long period by one person and therefore only one adjustment for that person is necessary, the bolts 70 are used as they provide a firmer connection between the parts 16 and 19 than is obtained by the mechanism shown in Fig. 6, although the mechanism of the latter figure effectively holds the parts in operative relation. However, as pleasure cars are frequently driven by a number of persons which will require that an adjustment of the vehicle wheel be made each time the driver is changed the foot actuated arm 45 is provided so that the driver is only required to press the arm forwardly to disengage the parts 16 and 19 sufficiently to allow the steering column to be raised or lowered. This convenient adjustment is also easily made for the shifting of the column longitudinally to suit the particular driver through the medium of the lever 55 and the link mechanism associated therewith.

From the foregoing it will be readily apparent that a steering column constructed in accordance with the present invention may be easily and quickly adjusted vertically or longitudinally to accommodate the individual driving the vehicle and also it will be apparent that because of the longitudinal adjustment which may be made of the steering column, the sudden forcible driving of the vehicle operator's body against the steering wheel will save the operator from serious injury because of the telescoping or collapsing of the steering column in the manner described.

What is claimed is:—

1. In a steering mechanism for a wheeled vehicle, a steering column comprising a solid shaft and a tubular shaft slidably receiving the solid shaft, a means operatively coupling one end of the solid shaft with the wheels of the vehicle for steering the latter, a hand wheel upon the outer end of the tubular shaft, a plurality of spaced bodies encircling said tubular shaft, a spring member housed in said tubular shaft and normally urging the shafts to separate longitudinally, a yieldable gripping means encircling the tubular shaft and adapted for selective engagement in the spaces between said bodies, supporting means for said gripping means, said gripping means and supporting means constituting a support for the tubular shaft and facilitating longitudinal adjustment of the tubular shaft upon the solid shaft, and means permitting the vertical adjustment of the connected tubular and solid shafts whereby the said hand wheel may be raised or lowered.

2. In a steering mechanism for a wheeled vehicle, including a rotatably mounted shaft, means operatively coupling one end with the vehicle wheels, a longitudinaly adjustable steering column including a solid shaft and a tubular shaft slidably receiving one end of the solid shaft, universal coupling means between the other end of the solid shaft and the other end of the first mentioned shaft, a hand wheel upon the other end of the tubular shaft, resilient means normally urging said tubular and solid shafts longitudinally in opposite directions, a fixed vertically slotted body having the tubular shaft extending therethrough and having a concave face concentric with the universal coupling, a movable body having an arcuate face coinciding with the concave face of the first body and having the tubular shaft extending therethrough, means between said bodies for maintaining the same in relatively adjusted relation, a series of circumferential grooves upon the outer surface of the tubular shaft, a centrally apertured two-part plate within said movable body between the parts of which plate the tubular shaft extends, resilient means normally urging the two parts of said plate into engagement with a groove of the tubular shaft, and means facilitating the manual separation of the two parts of said plate to permit movement of the tubular shaft in one direction, said grooves being formed to permit forcible movement of the tubular shaft in the other direction against the tension of the spring.

3. In a steering mechanism for a wheeled vehicle including a rotatably mounted shaft and means operatively coupling one end with the vehicle wheels, a longitudinally adjustable steering column including two telescopically connected portions, a universal coupling between the outer end of one of said portions and the other end of the first mentioned shaft, a hand wheel upon the outer end of the other portion of the column, resilient means normally urging said portions longitudinally in opposite directions, a fixed body having a vertical elongated passage therethrough through which the said other portion of the steering column passes, said last mentioned portion of the steering column having a plurality of ribs thereabout, said body having an arcuately recessed face, a shiftable body having an arcuate convex face adapted to position against said recessed face, coacting means between the faces and normally maintaining the same against relative movement, said shiftable body being chambered and having the ribbed portion of the steering column passing transversely therethrough, separable gripping elements within said chamber encircling and engaging between a pair of ribs, said gripping elements normally maintaining the engaged portion of the column against movement in one direction but permitting its movement in the opposite direction against the tension of said resilient means, and means for releasing the steering column from engagement by said gripping means whereby the wheel carrying portion of the column may be moved by said resilient means.

4. In a steering mechanism for a wheeled vehicle including a rotatably mounted shaft having operative connection with the vehicle wheels, a steering column comprising a shaft held against longitudinal movement and a tubular shaft for slidably receiving one end of the held shaft, coupling means between the other end of the held shaft and the first shaft, a steering wheel upon the other end of the tubular shaft, a plurality of rib members encircling the tubular shaft and in spaced relation one with the other, a supporting body having an opening through which the rib carrying portion of the tubular shaft passes, splines coupling the tubular and the held shafts, resilient means housed in said tubular shaft and normally urging the same outwardly relative to the held shaft, a two-part collar housed in said shaft supporting body and engaging the tubular shaft in the area of said ribs, resilient means normally drawing said two-part collar into engagement with the tubular shaft between two ribs thereof, said collar preventing the resilient means from shifting the tubular shaft in one direction, and cam actuated means for separating the two parts of said collar to permit the movement of the tubular shaft in the said one direction.

5. In a steering mechanism for a wheeled vehicle including a rotatably mounted shaft having operative connection with vehicle wheels, a steering column comprising a shaft held against longitudinal movement and a tubular shaft for slidably receiving one end of the held shaft, coupling means between the other end of the held shaft and the first shaft, a steering wheel upon the other end of the tubular shaft, a plurality of rib members encircling the tubular shaft and in spaced relation one with the other, a supporting body having an opening through which the rib carrying portion of the tubular shaft passes, splines coupling the tubular shaft with the shaft extending thereinto, resilient means housed in said tubular shaft, and normally urging the same outwardly relative to the shaft therein, a two-part collar housed in said shaft supporting means and engaging the tubular shaft in the area of said ribs, resilient means normally drawing the said two-part collar into engagement with the tubular shaft between two ribs thereof, said collar preventing the resilient means from shifting the tubular shaft in one direction, cam actuated means for separating the two parts of said collar to permit the movement of the tubular shaft in the said one direction, means permitting the vertical adjustment of the spline connected shafts relative to said first shaft, and means for securing the spline connected shafts in adjusted position.

6. In a wheeled vehicle, a steering column comprising inner and outer telescopically joined shafts, means joining the shafts permitting only relative longitudinal movement of the same, means operatively coupling an end of one shaft with the vehicle wheels, a steering wheel on the end of the other shaft remote from said coupling means, a plurality of bodies arranged longitudinally of the wheel carried shaft and each having a cam-like face and an abutment face, and a pair of resiliently coupled gripping jaws having the wheel shaft therebetween and co-acting to grip against a cam face of a body to hold the shaft against longitudinal movement and yielding to the application of pressure applied in one direction longitudinally of the wheel carried shaft to ride against and be separated by the engaged cam face and automatically grip the cam face of the next adjacent body on the wheel carried shaft.

7. In a wheeled vehicle, a steering column comprising inner and outer telescopically joined shafts, means joining the shafts permitting only relative longitudinal movement of the same, means operatively coupling an end of one shaft with the vehicle wheels, a steering wheel on the end of the other shaft remote from said coupling means, resilient means constantly urging longitudinal separatory movement of the shafts, said operative coupling permitting vertical oscillation of the column, a fixed body having a vertical recess through which the column extends, an apertured body having the column extending therethrough and coupled with the fixed body for vertical sliding movement, and gripping means carried by the apertured body and including two gripping elements resiliently joined and drawn together and having said wheel carried shaft secured therebetween whereby it is secured against longitudinal movement under the urge of said resilient urging means.

8. An improved steering column for a wheeled vehicle, comprising two telescopically joined shafts, means for operatively coupling one end of one shaft with the wheels of the vehicle for steering the same, a steering wheel carried by the other shaft, a supporting body for the column having a chamber and a transverse opening through which the wheel carrying shaft passes, a plurality of spaced circumferential ribs on said last shaft, a centrally apertured two-part plate in said chamber having said last shaft passing centrally therethrough, spring means urging said two plate parts together to engage the same between a pair of ribs, resilient means normally tending to separate the shafts of the column longitudinally in one direction, said plates acting to prevent said shaft separation and said ribs being formed on one side to effect separation of the plate parts permitting movement of the ribbed shaft in opposition to said resilient means upon the pressing of the wheel forwardly.

9. An improved steering column for a wheeled vehicle, comprising two telescopically joined shafts, means for operatively coupling one end of one shaft with the wheels of the vehicle for steering the same, a steering wheel carried by the other shaft, a supporting body for the column having a chamber and a transverse opening thru which the wheel carrying shaft passes, a plurality of spaced circumferential ribs on said last shaft, a centrally apertured two-part plate in said chamber having said last shaft passing centrally therethru, spring means urging said two plate parts together to engage the same between a pair of ribs, resilient means normally tending to separate the shafts of the column longitudinally in one direction, said plates acting to prevent said shaft separation and said ribs being formed on one side to effect separation of the plate parts permitting movement of the ribbed shaft in opposition to said resilient means upon the pressing of the wheel forwardly, and means for separating said plate parts to disengage the same from between a pair of ribs.

10. An improved steering column for a wheeled vehicle, comprising two telescopically joined shafts, means for operatively coupling one end of one shaft with the wheels of the vehicle for steering the same, a steering wheel carried by the other shaft, a supporting body for the column having a chamber and a transverse opening thru which the wheel carrying shaft passes, a plurality of spaced circumferential ribs on said last shaft, a centrally apertured two-part plate in said chamber having said last shaft passing centrally therethru, spring means urging said two plate parts together to engage the same between a pair of ribs, resilient means normally tending to separate the shafts of the column longitudinally in one direction, said plates acting to prevent said shaft separation, said ribs being formed on one side to effect separation of the plate parts permitting movement of the ribbed shaft in opposition to said resilient means upon the pressing of the wheel forwardly, cam elements disposed between said plate parts on opposite sides of the ribbed shaft, and means for oscillating the elements to effect separation of the plate parts to disengage the same from between a pair of ribs.

11. In a wheeled vehicle, including a rotatably mounted shaft operatively coupled with the vehicle wheels for steering the same, a universal joint, a steering column having one end coupled by said universal joint with said shaft, a fixed body having a vertical slot therein and having one face provided with an arcuate recess which is concentrically related with said universal joint, said column extending through said slot, a body having an arcuate face disposed against the arcuate surface of said recess and having a central opening through which the steering column passes, said last body being movable longitudinally in said recess by the oscillation of said steering column upon said universal joint, interengaging ribs and grooves upon the opposed surfaces of the movable body and the fixed body, spring elements coupling the movable body with the fixed body and normally tending to draw the movable body into the recess, and lever means oscillatably carried by the movable body and having sliding contact with the fixed body for shifting said movable body away from the fixed body against the resistance of said springs whereby to disengage the grooves and ribs and permit the oscillatory motion of the steering column.

12. In a wheeled vehicle including a rotatably mounted shaft having an operative connection at one end with the vehicle wheels for steering the same, a steering column, a universal joint coupling one end of said column with said shaft, a convex body having a vertical slot therethrough and having an arcuate recess formed in one face, the column being extended through the recess and slot, said recess being concentric with said joint, a shiftable body having a fixed face adapted to position against the concave surface of the recess, said body being disposed in the recess and having a passage therethrough for the steering column, said body further having two longitudinally extending slots therethru, interengaging means between the convex surface of the movable body and the concave surface against which the movable body bears, and bolt members extending through said last mentioned slots into the fixed body to retain the movable body in an adjusted position relative to the fixed body.

13. In a wheeled vehicle, a steering column comprising inner and outer telescopically jointed shafts, means coupling the shafts permitting only relative longitudinal movement of the same, means operatively coupling an end of one shaft with the vehicle wheels, a steering wheel carried by the other shaft, resilient means normally urging the longitudinal separation of said shafts, said steering wheel carrying shaft having a plurality of circumferentially extending spaced ribs thereon, a supporting body having a central passage through which the ribbed portion of the steering wheel carrying shaft passes, said body having a chamber therein, a pair of plate members within said chamber upon opposite sides of said ribbed shaft and having opposing recessed edges adapted to enter between two of said ribs, spring means within the chamber normally urging said plates together into gripping relation with the ribbed shaft, said ribs having cammed surfaces upon one side permitting movement of the ribs between, and the separation of, the plates, the movement of the ribbed shaft to separate the plate being in opposition to said resilient means, cam members interposed between the opposed edges of said plates, and means facilitating the oscillation of the said cam members to effect the separation of the plates.

14. In a wheeled vehicle, a steering column comprising inner and outer telescopically joined shafts, means coupling the shafts permitting only relative longitudinal movement of the same, means operatively coupling an end of one shaft with the vehicle wheels, a steering wheel carried by the other shaft, resilient means normally urging the longitudinal separation of said shafts, said steering wheel carrying shaft having a plurality of circumferentially extending spaced ribs thereon, a supporting body having a central passage through which the ribbed portion of the steering wheel carrying shaft passes, said body having a chamber therein, a pair of plate members within said chamber upon opposite sides of said ribbed shaft and having opposing recessed edges adapted to enter between two of said ribs, spring means within the chamber normally urging said plates together into gripping relation with the ribbed shaft, said ribs having cammed surfaces upon one side permitting movement of the ribs between, and the separation of, the plates, the movement of the ribbed shaft to separate the plates being in opposition to said resilient means, cam members interposed between the opposed edges of said plates, means facilitating the oscillation of the said cam members to effect the separation of the plates, and a collar at the end of the ribbed shaft remote from the steering wheel which is adapted to prevent the withdrawal of the ribbed shaft through the passage of the supporting body.

15. In a steering mechanism for wheeled vehicles including an oscillatable mechanism operatively coupled with the vehicle wheels for imparting steering movement thereto, a steering column having two elongated parts coupled for relative longitudinal movement to lengthen or shorten the column, universal coupling means between an end of one of said parts and said mechanism, a hand wheel upon the remote end of the other part, a fixed body having a vertical slot through which the column passes, a movable body mounted on the fixed body for movement in an arcuate path concentric with the universal coupling, said movable body having a passage alined with said slot and said column extending through said passage, means for retaining the movable body in a position of adjustment on the fixed body, and a gripping means for said column including a part carried by the movable body and a part carried by the adjacent part of the column, said gripping means parts co-acting to permit shortening of the column by application of pressure in one direction to the hand wheel.

16. In a steering mechanism for wheeled vehicles including oscillatable mechanism operatively coupled with the vehicle wheels for imparting steering movement thereto, a steering column, a coupling between one end of the column and said oscillatable mechanism whereby vertical oscillation of the column is permitted, said column including two coupled parts one of which is longitudinally movable to facilitate changing the length of the column, a steering wheel upon the other end of the column and attached to said movable part, and means for selectively gripping said movable part at a plurality of places therealong to maintain the parts in selected adjustable relation, comprising a pair of relatively movable jaw members between which said movable part is interposed, means constantly drawing said jaw members together to grip said interposed part, oscillatable separating members interposed between the jaws, and link and lever means coupled with said members for oscillating the same and effecting the separatory movement of said jaws.

17. In a steering mechanism for wheeled vehicles including oscillatable mechanism operatively coupled with the vehicle wheels for imparting steering movement thereto, a steering column, a coupling between one end of the column and said oscillatable mechanism whereby vertical oscillation of the column is permitted, said column including two coupled parts one of which is longitudinally movable to facilitate changing the length of the column, a steering wheel upon the other end of the column and attached to said movable part, and means for selectively gripping said movable part at a plurality of places therealong to maintain the parts in selected adjustable relation, comprising a pair of relatively movable jaw members between which said movable part is interposed, means constantly drawing said jaw members together to grip said interposed part, oscillatable separating members interposed between the jaws, link and lever means coupled with said members for oscillating the same and effecting the separatory movement of said jaws, and bodies on and spaced longitudinally of said interposed part of the column and between which the jaws engage, each having one side face oblique to the length of the column to form a camming surface effective to force the jaws apart when the interposed part is shifted in one direction and having a radially directed face which through contact with the jaws normally prevents movement of the said interposed part in the opposite direction.

18. In a steering column structure of the character described, including two telescopically coupled shafts having means preventing relative rotary motion, means for effecting transfer of electric current in a circuit from one shaft to the other without breaking the circuit, comprising a current carrying strip secured longitudinally of and insulated from each shaft, the strips being in alined, spaced, and opposed relation, a spring-pressed contact element carried by one strip and engaging the other, and means for transferring current from the column to a fixed contact comprising an annual current conductor mounted on the column to turn therewith and having wiping engagement with said fixed contact and electrical connection with one of the strips.

WILLIAM G. THURBER.